DYNAMIC MEMORY SPAN ADJUSTMENT FOR FLYING HEADS

Filed July 14, 1961 3 Sheets-Sheet 1

INVENTOR.
Allen K. Baillif
BY Herbert M. Birch
ATTORNEY

June 29, 1965 A. K. BAILLIF 3,192,514

DYNAMIC MEMORY SPAN ADJUSTMENT FOR FLYING HEADS

Filed July 14, 1961 3 Sheets-Sheet 2

INVENTOR.

Allen K. Baillif

BY Herbert M. Birch

ATTORNEYS.

DYNAMIC MEMORY SPAN ADJUSTMENT FOR FLYING HEADS

Filed July 14, 1961 3 Sheets-Sheet 3

INVENTOR.
Allen K. Baillif
BY Herbert M. Birch
ATTORNEYS

United States Patent Office 3,192,514

Patented June 29, 1965

3,192,514
DYNAMIC MEMORY SPAN ADJUSTMENT FOR FLYING HEADS

Allen K. Baillif, Minneapolis, Minn., assignor to Sperry Rand Corporation, New York, N.Y., a corporation of Delaware Filed July 14, 1961, Ser. No. 124,129
14 Claims. (Cl. 340—174.1)

This invention relates to a span adjusting and mounting means for flying heads, and more particularly, for a multiplicity of flying heads as utilized adjacent a selectively magnetizable moving recording surface in a dynamic memory unit for providing a continuous recirculation of data therein.

The terminology "flying head" has become known in the art as transducer such as a magnetic reluctance pick-up or the like which is mounted immediately adjacent to a moving surface such as that of a magnetic memory drum for the purpose of recording or detecting information recorded thereon in discrete bits or wave patterns. Rather than being in contact with the surface of the recording medium in the manner of conventional transducers, the flying head is supported on a thin film of fluid or air between the head itself and the moving recording surface. Thus, great speed of operation without the normally attendant friction and wear is made possible. The fluid film may be supplied by external means or may be created by the action of viscous friction or drag between the moving recording surface and the ambient fluid around it.

In the particular record-reproduce or read-write operation for which the present invention is adapted, a pair of read and write transducer heads are mounted at a given span distance from one another adjacent a moving recording surface. The span distance is a designation of the number of intervening memory cells or areas on the recording surface adapted to receive information bits or the like. By continuously reading bits out of successive memory cells and writing the same bit in another cell a given number of memory cells away from the original, all of the data on the recording surface may be recirculated as the surface moves and thus be always available at the transducer heads for rapid access. This type of memory circuit is known in the art as a revolver circuit.

In memory circuits of the above-defined type, it is required that the span adjustment between the read and write heads be adjustable to a high degree of accuracy. Also, since in computer circuitry and the like a large number of components are necessary, an accurate but simple means of adjustment to reduce maintenance problems and expense is a prime requisite.

It is, therefore, a primary object of this invention to provide a novel mounting and span adjusting means for cooperating read-write transducers of the flying head type.

Another object of this invention is to provide a novel mounting and span adjusting means for cooperating read-write flying heads wherein the adjusting means is extremely accurate and is structurally simple.

Another object of this invention is to provide a novel mounting and span adjustment for cooperating read-write flying heads wherein no conventional positioning clamps, screws, or the like are associated with the said flying heads for the purpose of the said span adjustment.

Still another object of this invention is to provide a novel mounting and span adjustment for cooperating read-write flying heads wherein the mounting means includes cantilever type leaf springs for maintaining each of said heads adjacent a moving recording surface and the said span adjusting means comprises a device operating on at least one of the said leaf springs to effect the span adjustment.

These and other objects of the invention will become apparent with reference to the following specification and drawings which relate to a preferred embodiment of the invention.

Figure 1:
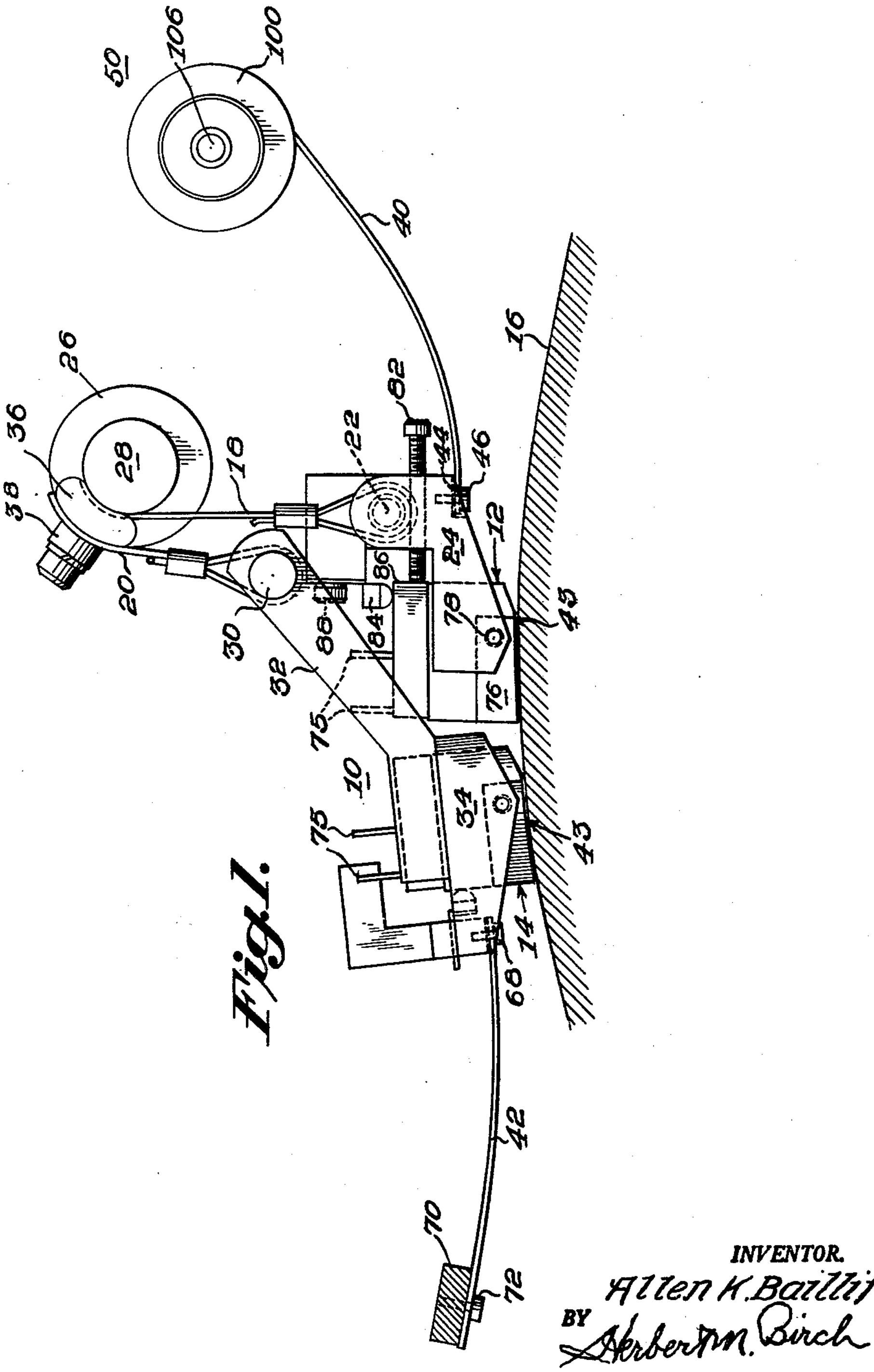
FIGURE 1 is a side view of a read-write flying head arrangement incorporating the invention.

Referring in detail to the drawings and more particularly to FIGURE 1, a pair of cooperating read-write transducer heads generally indicated at 10 are shown as comprising a read or reproducing head 12 and a write or recording head 14 mounted immediately adjacent but out of contact with a moving recording surface 16.

The transducer heads 12 and 14 are adjustably suspended above the recording surface 16 by a pair of cables 18 and 20, respectively. The cable 18, is looped about a fixed stud 22 mounted in the cradle structure 24 of the reading or reproducing head 12 and extends therefrom to a cable reel or pulley 26 fixedly mounted on a rotatable head-actuating shaft 28. The cable 20 is looped about a fixed stud 30 mounted in an elongated arm 32 of the cradle structure 34 of the recording or writing head 14 and extends therefrom to the same cable reel or pulley 26 on the shaft 28 as does the cable 18.

The cable pulley 26 is constructed such that the raising and lowering support cables 18 and 20 mounted thereon are spaced from one another by an eccentric 36 and held in place thereon by a screw clamp 38 to give each cable a predetermined operating radius with respect to the axis of rotation of the cable actuating shaft 28. This radius is calculated in accordance with the relative positions of the fixed studs 22 and 30 on the cradle structures 24 and 34 of the transducer heads 12 and 14, respectively, such that for a given angular rotation of the shaft 28, the transducer heads 12 and 14 will be raised or lowered in unison and the same distance from the recording surface 16. The cable 18 is beneath the eccentric 36 and held against the surface of the head actuating shaft 28. The cable 20 is held against the top of the eccentric 36, at a greater radial distance from the center of the head actuating shaft 28 than the cable 18, by the action of the screw clamp 38.

In order to accurately retain the set position of the transducer heads 12 and 14 with respect to the moving recording surface 16, when the head actuating shaft 28 has been angularly adjusted to remove the supporting action of the said cables 18 and 20 from the heads 12 and 14, additional means in the form of cantilever type leaf springs 40 and 42, respectively, are provided to maintain a proper operating bias on the transducer heads 12 and 14 whereby the proper spacing between the heads and the recording surface 16 may be maintained by the film of fluid operating in the gaps 43 therebetween to hold the heads 12 and 14 immediately adjacent but out of contact with the moving recording surface 16.

Figure 2:
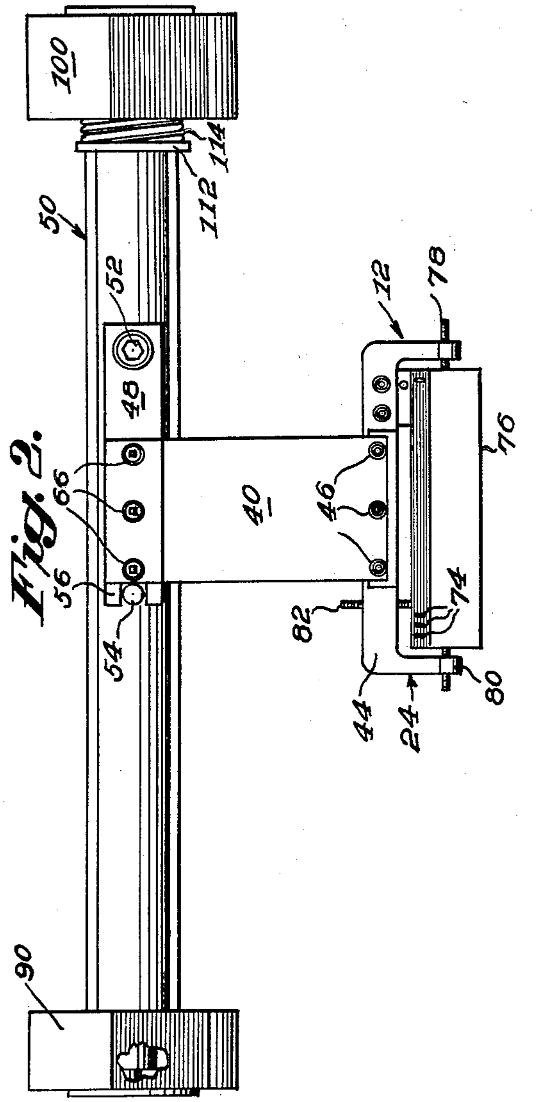
FIGURE 2 is a bottom view of one of the flying heads shown in FIGURE 1 including an embodiment of the span adjusting means of the invention.
Figure 4:
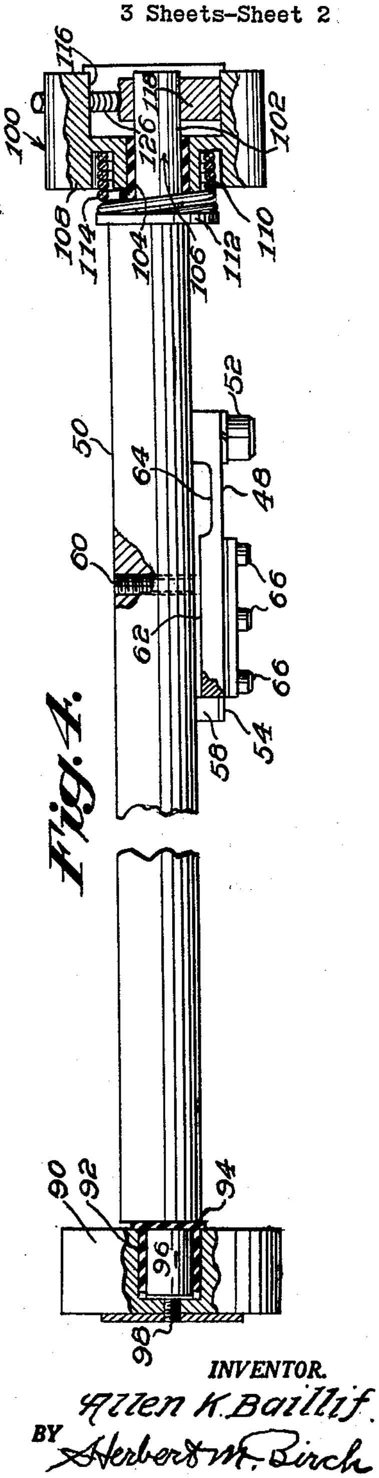
FIGURE 4 is a detailed view of FIGURE 2 in partial cross-section.

Referring in addition to FIGURE 2, the leaf spring 40 on the reading head 12 is shown as being mounted on a lower surface 44 of the cradle 24 by a plurality of cap screws or the like 46. The spring 40 extends from the cradle 24 of the reading head 12 to a mounting or retaining plate 48 mounted on the flat lower periphery of a head loading shaft 50 and extending along the head loading shaft 50 generally parallel to the axis of rotation thereof. The mounting plate 48 is held to the head loading shaft 50 by a cap screw 52 and pin 54 cooperates with a bifurcated portion 56 on the end of the plate 48 to prevent same from pivoting about the cap screw 52. As shown in FIGURE 4, the mounting plate 48 is made more rigid by the action of a set screw 60 extending through the head leading shaft 50 and pressing against the back surface 62 of the mounting plate 48. A cutout portion 64 in the back surface 62 of the plate 48 is provided to give a spring action thereto against the set screw 60.

The leaf spring 40 is secured to the mounting plate 48 on the head loading shaft 50 by means of a plurality of cap screws 66 or the like which hold the end of the spring 40 flush with the front face of the plate 48.

The leaf spring 42 on the writing head 14 is mounted to the underside of the cradle 34 thereof by means of cap screws 68 or the like. The spring 42 extends from the cradle 34 to a second head loading shaft 70 generally indicated in FIGURE 1 and is mounted on the lower flat surface thereof by cap screws 72 or the like. The details of the head loading shaft 70 may be identical to those of the head loading shaft 50 and are therefore, only generally shown. The loading shaft 70 may, however, be made fixed rather than adjustable as will hereinafter become apparent.

Figure 3:
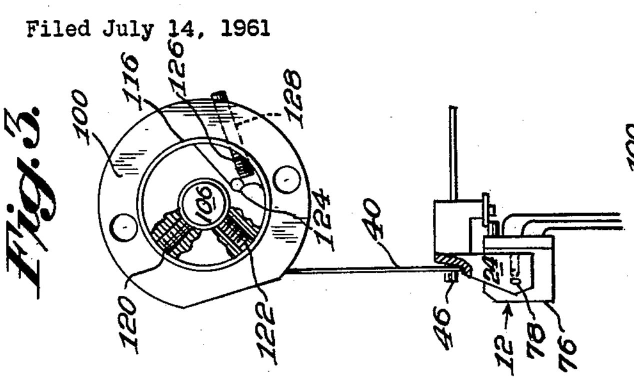
FIGURE 3 is an end view of FIGURE 2.

Referring now in more detail to FIGURES 2 and 3 the reading head 12 is shown to comprise a plurality of individual transducers 74 (FIGURE 2) embedded in a generally rectangular block 76 which is pivotally mounted across the open end of the U-shaped cradle 24. A plurality of electrical leads 75 are provided for the plurality of transducers 74 as shown in FIGURE 1. A pair of opposed set screws 78 and 80 which pass through the arms of the cradle and into engagement with cooperating recesses or the like (not shown) in the block 76 provide both a pivot axis for the transducer head and a means of lateral adjustment therefore along the pivot axis.

An adjustment whereby the attitude of the transducer head carrying block 76 is varied with respect to the recording surface about the pivot screws 78 and 80 is shown in FIGURES 1 2 and 3 as comprising a set screw 82 and a stop member 84 which engage adjacent surfaces of the block 76 at right angles with one another about the upper corner 86 of the block 76. The stop 84 is adjustably positioned on the cradle 24 by means of a cap screw 88. The adjustment means and the pivot means on the writing head 14 is generally similar to that of the reading head 12 and need not be further described.

The span adjusting means for the read-write head combination 10 is shown in detail in FIGURES 2, 3 and 4.

The head-loading shaft 50 is journalled at one end in a suitable supporting member 90 having a socket 92 therein lined with a nylon bearing sleeve or the like 94 for receiving the necked-down end 96 of the head-loading shaft 50. A set screw 98 is positioned in the closed end wall of the socket 92 for the purpose of adjusting the socket to compensate for longitudinal play in the head-loading shaft 50.

At the opposite end of the head-loading shaft 50 is a fixed generally cylindrical span-adjusting rotor housing 100 having a central bore 102 therein lined with a flanged nylon bearing sleeve 104 for receiving an elongated necked-down portion 106 of the head-loading shaft 50.

Concentric and coaxially extending with the bearing sleeve 104 and cut out of the inner face 108 of the housing 100 is a double-walled cylindrical cavity or recess 110. A peripheral flange 112 substantially integral with the head-loading shaft 50 defining the beginning of the elongated necked-down portion 106 thereof cooperates with the cylindrical cavity 110 to contain a helical biasing spring 114 concentrically coiled about the neck-down portion 106 of the head-loading shaft 50 to bias the said shaft 50 in one direction of rotation.

An enlarged cylindrical socket 116 is provided in the outer end face of the housing 100 and is disposed coaxially with respect to the central bore 102 as a countersunk enlarged extension thereof to receive the outer end of the elongated necked-down portion 106 of the shaft 50 extending out of the central bore 102.

Mounted on the outer end of the necked-down portion 106 of the shaft 50 and concentrically disposed within the enlarged socket 116 is a span-adjusting rotor 118 fixed to the necked-down portion 106 by a pair of radially disposed set screws 120 and 122. One portion of the periphery of the span-adjusting rotor 118 is notched cut to provide a radially disposed cam surface 124. The cam surface 124 cooperates with a generally tangentially disposed set screw 126 extending through a threaded bore 128 in the housing 100 into the enlarged socket 116. The set screw 126 opposes the bias of the concentrically disposed coil spring 114 on the necked-down portion 106 to maintain the head-loading shaft 50 in a preselected setting.

Figure 5:
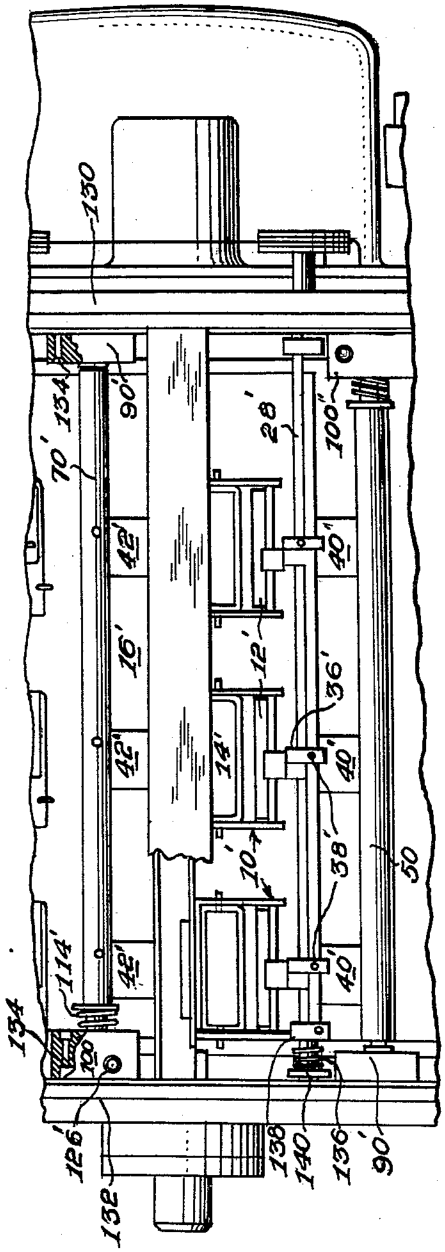
FIGURE 5 is a top plan view of a portion of a system incorporating a multiplicity of cooperating read-write heads embodying the present invention.

A plurality of cooperating read-write transducer heads 10′ mounted on a common head-actuating shaft 28′ and common head-loading shafts 50′ and 70′ above a moving recording surface 16′ are shown in FIGURE 5. All corresponding numerals appearing in FIGURES 1, 2, 3 and 4 are primed in FIGURE 5.

The shaft end housings 90′ and 100′ for the shaft 50′ are bolted to side frames 130 and 132, respectively, by a plurality of bolts 134. A like mounting arrangement is provided for the head-loading shaft 70′ which is shown as having end housings 90′ and 100′ reversed in order from those on the head-loading shaft 50′. The head-actuating shaft 28′ is journalled directly into the side frames 130 and 132. A coiled concentrically disposed biasing spring 136 is provided on one end of the shaft 28′ between a fixed collar 138 on the shaft and a collar 140 adjacent the inner surface of the frame 132 to bias the shaft 28′ in one direction of rotation.

*Operation*

Referring now to FIGURE 1, the general operation of the invention will now be described. The showing of FIGURE 5 may also be referred to by noting the primed numbers therein referred to in connection with FIGURE 1.

Before any driving power is transmitted to the dynamic memory unit generally illustrated, the recording surface 16 is at a standstill. Also, no fluid film is present over the recording surface 16 and the individual read and write heads 12 and 14, respectively, must be held out of contact with the surface 16.

This is accomplished by turning the head actuating shaft 28 in a clockwise direction, as shown in FIGURE 1, whereby the cable reel 26 thereon is rotated. Upon rotation of the cable reel 26, the head supporting cables 18 and 20 are taken up thereby which causes those portions of the cables 18 and 20 looped about the studs 22 and 30 on the cradles 24 and 34 of the read and write heads 12 and 14, respectively, to lift the heads, in unison, a predetermined distance about the recording surface 16. This lifting action of the cables 18 and 20 is in opposition to the constant bias applied to the heads 12 and 14 by the cantilever leaf springs 40 and 42, respectively, which bias always acts to force the heads 12 and 14 down onto the recording surface 16.

As soon as power is applied to the unit, the recording surface 16 is driven past the heads 12 and 14 at a constant speed. As previously disclosed herein, the viscous friction between the surface 16 and the ambient fluid thereabout creates a thin fluid film over the entire moving recording surface 16.

As soon as the recording surface is brought up to speed, the head actuating shaft 28 is rotated in a counterclockwise direction as shown in FIGURE 1 and the read and write heads 12 and 14 are lowered toward the moving recording surface 16. After the heads 12 and 14 are lowered a predetermined amount, they come into contact with the fluid film travelling with the moving recording surface 16 and are thereby supported above the surface 16 by a nominal gap 43 as shown in FIGURE 1.

In order to achieve uniform recording and reproducing, it is important that a constant separation of transducer head and recording surface be maintained. This may be accomplished by adjusting the bias placed on the heads 12 and 14 by the cantilever leaf springs 40 and 42 to within a permissible range of values calculated to maintain a uniform head-to-surface spacing in the gaps 43.

Referring additionally to FIGURE 3, the bias on the cantilever springs 40 and 42 is determined by the amount of bow in the springs between the transducer head cradles 24 and 34 and the head-loading shafts 50 and 70, respectively. The initial bias within the acceptable range of values is first achieved by adjusting the set screw 126 in the end housing 100 against the radial cam face 124 on the head-loading shafts 50 and 70 to rotate the span-adjusting cam rotor 118, whereby the shafts are rotated to vary the bow in the springs 40 and 42. This is a result of the action of the flat mounting plate 48 on the two shafts which applies a bending moment to the end of the cantilever spring attached thereto by the cap screws 66. The above-described details have only been disclosed herein with respect to the head-loading shaft 50 and the spring or springs 40, but it is to be understood that such details can be duplicated with respect to the shaft 70 and the spring or springs 42.

Once the proper bias has been placed on the read and write heads 12 and 14, the span of memory cells on the recording surface 16 between the two heads must then be adjusted. The read and write head units 12 and 14 are so dimensioned initially as to be separated by a nominal number of memory cells on the moving recording surface 16, whereby the initial span is roughly set when the cantilever springs 40 and 42 are in a bowed condition such that the bias applied to said heads is within the permissible range.

Since the span adjustment now required is over minute and very exacting distances, further adjustment of the bow in the springs 40 and 42 or in a single spring (40 in this instance) within the permissible range will, by virtue of the action of the head loading shafts 50 and 70 and the bending moment applied thereby to the springs 40 and 42, cause the heads 12 and 14 to traverse the moving recording surface 16 on the fluid film in the gaps 43 toward or away from each other depending on the direction of adjustment of the cam adjusting set screw 126 against the radial cam face 124 and the consequent rotation of the span-adjusting rotor 118 and the head-loading shaft 50. Thus, an accurate, precise and reproducible span adjustment between the read and write heads 12 and 14 to properly index the same over a desired span of memory cells on the moving recording surface 16 is provided without the use of any additional structure than is already necessary for proper mounting and functioning.

As can be seen from the foregoing specification and drawings, this invention provides a novel mounting and span adjusting means for cooperating pairs of read-write transducer heads as used in dynamic memory circuits or revolvers as they are known in the art.

It is to be understood that the embodiment shown and described herein is for the purpose of example only and is not intended to limit the scope of the appended claims.

What is claimed is:

1. Mounting and span-adjusting means for positioning cooperating pair of read-write transducer heads with respect to a moving recording surface in a dynamic memory unit wherein said heads are supported on a fluid film between themselves and said surface, said cooperating pair of read-write transducer heads being in registry with a selected recording channel on said recording surface comprising flexible biasing means for each of said transducer heads for biasing each of said heads toward said recording surface and means operating on at least one of the said biasing means to change the bias thereon in such a way as to effect a translation of the transducer head associated therewith across the said recording surface along said recording channel on said fluid film and toward or away from the other of said transducer heads, in registry with said selected recording channel, whereby a span adjustment between the two heads of said cooperating pair is provided.

2. Mounting and span-adjusting means for positioning cooperating pair of read-write transducer heads with respect to a moving recording surface in a dynamic memory unit wherein said heads are supported on a fluid film between themselves and said surface, said cooperating pair of read-write transducer heads being in registry with a selected recording channel on said recording surface comprising support means common to both said read and said write heads for adjustably postioning said heads in a direction substantially normal to said recording surface, flexible biasing means for each of said transducer heads for biasing each of said heads toward said recording surface, and means operating on at least one of the said biasing means to change the bias thereon in such a way as to effect a translation of the transducer head associated therewith across the said recording surface along said recording channel on said fluid film and toward or away from the other of said transducer heads, in registry with said selected recording channel, whereby a span adjustment between the two heads of said cooperating pair is provided.

3. Mounting and span-adjusting means for positioning cooperating pairs of read-write transducers heads with respect to a moving recording surface in a dynamic memory unit wherein said heads are supported on a fluid film between themselves and said surface, each of said cooperating pairs of read-write transducer heads being in registry, respectively, with a selected recording channel on said recording surface, comprising a pair of parallel shafts each angularly adjustable about its longitudinal axis mounted above said surface, cantilever leaf type springs attached at one end to said shafts and at the other end to said transducer heads, said read heads being attached all to one shaft and spring combination and said write heads to the other, said leaf springs being bowed in a direction acting to bias said transducer heads toward said recording surface, and means on at least one of said shafts for changing the angular position of said shaft about the longitudinal axis thereof to vary the bow of the springs attached thereto, whereby a translation of the respective transducer heads attached to the last referenced springs will be effected across said recording surface, respectively, along said selected recording channels on said fluid film and toward or away from the other transducer heads in registry, respectively, with said selected recording channels, whereby a span adjustment between the two heads of each cooperating pair is provided.

4. The invention defined in claim 3, wherein each of said parallel shafts includes a flat peripheral portion facing said recording surface to which the ends of said leaf springs are attached, whereby a bending moment may be applied to said springs to change the bow thereof in response to an angular adjustment of said shafts about their respective longitudinal axes.

5. The invention defined in claim 3, wherein each of said parallel shafts includes necked-down end portions journalled in fixed end housings for rotation therein, one of said end housings on at least one of said shafts including an enlarged cavity extending substantially coaxially of said shaft and enclosing a part of said necked-down portion thereof; and wherein said means for changing the angular position of said shaft about the longitudinal axis thereof comprises a cam means fixedly mounted on the necked-down portion of said shaft within said cavity, a cam surface on said cam means substantially radially disposed with respect to the longitudinal axis of rotation of said shaft, and adjustable cam actuating means extending through said one of said end housings into said enlarged cavity and into engagement with said cam surface, whereby adjustment of said cam actuating means toward or away from said cam surface will cause said shaft to rotate about the longitudinal axis thereof by an amount corresponding to the movement of the said cam surface.

6. The invention defined in claim 5, wherein each of said parallel shafts includes a flat peripheral portion facing said recording surface to which the ends of said leaf springs are attached, whereby a bending moment may be applied to said springs to change the bow thereof in response to an angular adjustment of said shafts about their respective longitudinal axes.

7. The invention defined in claim 3, wherein each of said parallel shafts includes necked-down end portions journalled in fixed end housings for rotation therein, one of said end housings on at least one of said shafts including an enlarged cavity extending substantially coaxially of said shaft and enclosing a part of said necked-down portion thereof and biasing means on said one of said shafts connected between said shaft and said one of said end housings for biasing said one of said shafts in one direction of rotation about its longitudinal axis; and wherein said means for changing the angular position of said shaft about the longitudinal axis thereof comprises a cam means fixedly mounted on the necked-down portion of said shaft within said cavity, a cam surface on said cam means substantially radially disposed with respect to the longitudinal axis of rotation of said shaft, and adjustable cam actuating means extending through said one of said end housings into said enlarged cavity and into engagement with said cam surface, whereby adjustment of said cam actuating means toward or away from said cam surface coupled with the action of said biasing means will cause said shaft to rotate about the longitudinal axis thereof by an amount corresponding to the movement of the said cam surface.

8. The invention defined in claim 7, wherein each of said parallel shafts includes a flat peripheral portion facing said recording surface to which the ends of said leaf springs are attached, whereby a bending moment may be applied to said springs to change the bow thereof in response to an angular adjustment of said shafts about their respective longitudinal axes.

9. Mounting and span-adjusting means for positioning cooperating pairs of read-write transducer heads with respect to a moving recording surface in a dynamic memory unit wherein said heads are supported on a fluid film between themselves and said surface, each of said cooperating pairs of read-write transducer heads being in registry, respectively, with a selected recording channel on said recording surface, comprising, support means common to both said read and said write heads mounted above said surface including a head actuating shaft angularly adjustable about its longitudinal axis with a separate cable reel thereon for each pair of read-write transducer heads and support cables for each of said read and write heads mounted on said reels and connected to said heads for raising or lowering said heads with respect to said surface in response to a corresponding angular adjustment of said actuating shaft; a pair of parallel head loading shafts each angularly adjustable about its longitudinal axis and mutually parallel with said head actuating shaft mounted above said surface, cantilever leaf type springs attached at one end to said shafts and at the other end to said transducer heads, said read heads being attached all to one shaft and spring combination and said write heads to the other, said leaf springs being bowed in a direction acting to bias said transducer heads toward said recording surface, and means on at least one of said shafts for changing the angular position of said shaft about the longitudinal axis thereof to vary the bow of the springs attached thereto, whereby a translation of the respective transducer heads attached to the last referenced springs will be effected across the said recording surface, respectively, along said selected recording channels on said fluid film and toward or away from the other of said transducer heads, whereby a span adjustment between the two heads of each cooperating pair is provided.

10. The invention defined in claim 9, wherein each of said parallel shafts includes a flat peripheral portion facing said recording surface to which the ends of said leaf springs are attached, whereby a bending moment may be applied to said springs to change the bow thereof in response to an angular adjustment of said shafts about their respective longitudinal axes.

11. The invention defined in claim 9, wherein each of said parallel shafts includes necked-down end portions journalled in fixed end housings for rotation therein, one of said end housings on at least one of said shafts including an enlarged cavity extending substantially coaxially of said shaft and enclosing a part of said necked-down portion thereof; and wherein said means for changing the angular position of said shaft about the longitudinal axis thereof comprises a cam means fixedly mounted on the necked-down portion of said shaft within said cavity, a cam surface on said cam means substantially radially disposed with respect to the longitudinal axis of rotation of said shaft, and adjustable cam actuating means extending through said one of said end housings into said enlarged cavity and into engagement with said cam surface, whereby adjustment of said cam actuating means toward or away from said cam surface will cause said shaft to rotate about the longitudinal axis thereof by an amount corresponding to the movement of the said cam surface.

12. The invention defined in claim 11, wherein each of said parallel shafts includes a flat peripheral portion facing said recording surface to which the ends of said leaf springs are attached, whereby a bending moment may be applied to said springs to change the bow thereof in response to an angular adjustment of said shafts about their respective longitudinal axes.

13. The invention defined in claim 9, wherein each of said parallel shafts includes necked-down end portions journalled in fixed end housings for rotation therein, one of said end housings on at least one of said shafts including an enlarged cavity extending substantially coaxially of said shaft and enclosing a part of said necked-down portion thereof and biasing means on said one of said shafts connected between said shaft and said one of said end housings for biasing said one of said shafts in one direction of rotation about its longitudinal axis; and wherein said means for changing the angular position of said shaft about the longitudinal axis thereof comprises a cam means fixedly mounted on the necked-down portion of said shaft within said cavity, a cam surface on said cam means substantially radially disposed with respect to the longitudinal axis of rotation of said shaft, and adjustable cam actuating means extending through said one of said end housings into said enlarged cavity and into engagement with said cam surface, whereby adjustment of said cam actuating means toward or away from said cam surface coupled with the action of said biasing means will cause said shaft to rotate about the longitudinal axis thereof by an amount corresponding to the movement of the said cam surface.

14. The invention defined in claim 13, wherein each of said parallel shafts includes a flat peripheral portion facing said recording surface to which the ends of said leaf springs are attached, whereby a bending moment may be applied to said springs to change the bow thereof in response to an angular adjustment of said shafts about their respective longitudinal axes.

References Cited by the Examiner

UNITED STATES PATENTS

| | | | |
|---|---|---|---|
| 2,862,781 | 12/58 | Baumeister | 340—174.1 |
| 2,887,890 | 5/59 | Schardt | 340—174.1 |

IRVING L. SRAGOW, *Primary Examiner.*